3,046,535
MEASUREMENT APPARATUS

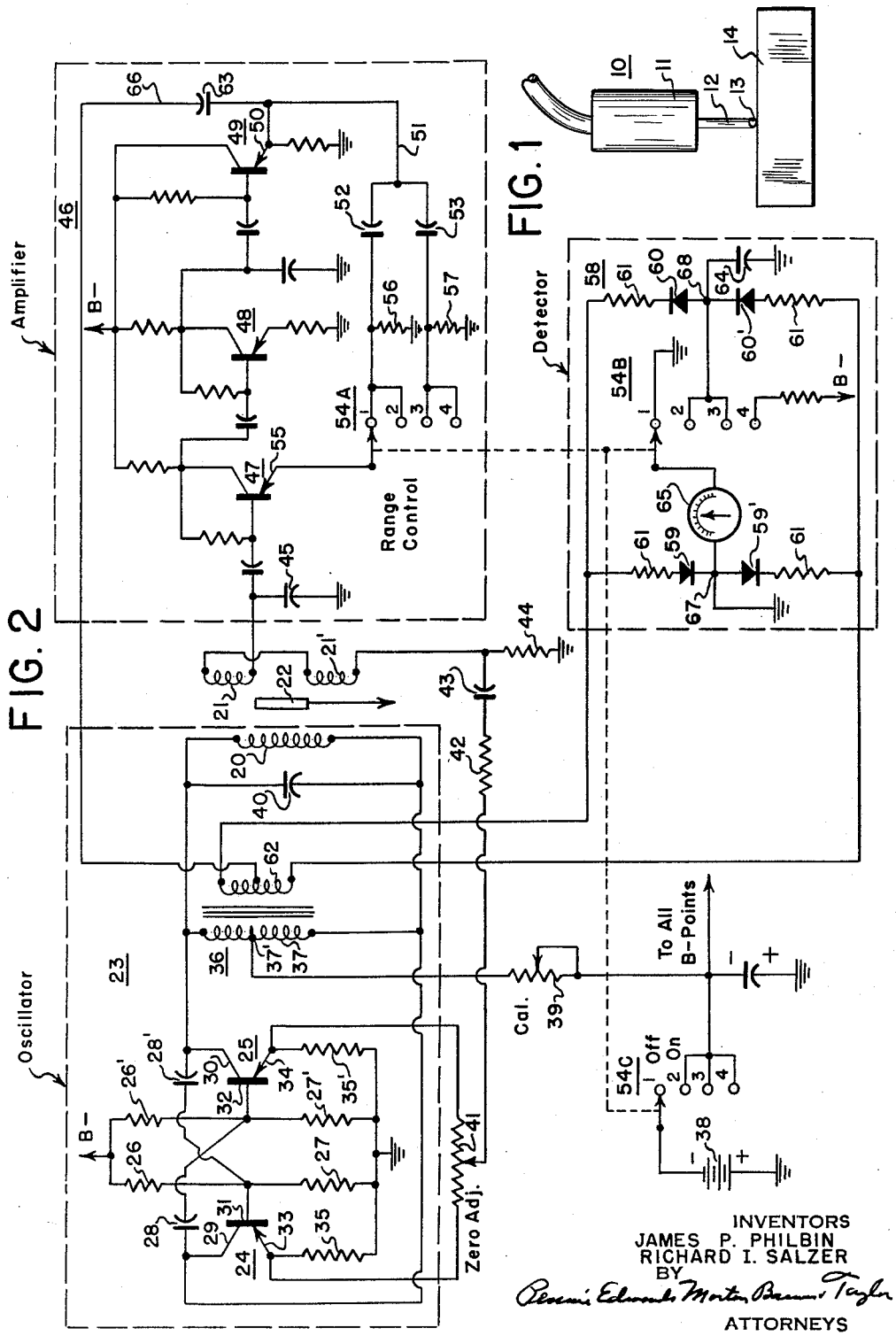

James P. Philbin and Richard I. Salzer, East Northport, N.Y., assignors to Cutler-Hammer Inc., Milwaukee, Wis., a corporation of Delaware
Filed Feb. 2, 1959, Ser. No. 790,645
17 Claims. (Cl. 340—199)

This invention relates to electronic gaging apparatus capable of measuring dimensions with a high degree of accuracy.

In many phases of industry where precision manufacturing is involved there is great need for a rugged portable gage that is capable of measuring part sizes over a considerable range with great accuracy. The usual need is for measurement of departures from a nominal size for tolerance and control purposes, either during or after production.

In industrial gaging applications, it is important that the gaging apparatus be capable of speedy and accurate zero adjustment to nominal part size. It is also desirable to have two or more range scales available, for coarse and fine readings. Furthermore, it is important that the nominal zero adjustment as well as the overall calibration remain stable.

To promote widespread use, it is highly desirable to satisfy these criteria in an instrument that is small, light weight and self-powered, so that it can be taken to the job and placed in use with maximum convenience. It has been found that transistors, when employed in suitable circuits in accordance with the invention, are highly satisfactory for the purpose.

It is accordingly a primary purpose of the present invention to provide a compact portable transistorized gage which has high measuring accuracy and sensitivity, along with excellent calibration stability and long battery life.

In accordance with an embodiment of this invention, the A.-C. output of a stable transistor oscillator is supplied to the primary winding of a variable differential transformer gage head, and the A.-C. voltage induced in the transformer secondary windings is amplified by a stable transistor amplifier of selectable gain, rectified or detected, and applied to an indicator device. Unique circuitry is provided to afford simple instrument calibration, zero adjustment and range or sensitivity selection, with minimum power consumption and a high degree of gain or measurement stability and linearity.

In accordance with one aspect of this invention the primary winding of a variable differential transformer is tuned and used as the primary frequency-determining element in an efficient transistor oscillator. Advantageously, the tuned primary is connected between the collector terminals of a pair of cross-coupled transistors. This oscillator has excellent frequency and temperature stability, employs relatively few components and is economical in power consumption, thus making it well suited for portable service.

In accordance with another aspect of the invention, gage calibration is effected by adjustment of a variable resistance in series with the voltage supply for the transistor oscillator. The variable resistance functions as a current limiting means for the transistor oscillator and causes the oscillator output voltage to vary inversely with the resistance value used. This provides an effective means for calibrating the gage, without unnecessary power consumption.

In accordance with a further aspect of this invention, zero-adjustment means is provided including an adjustable potentiometer coupled to the oscillator transistor emitters, thereby providing an A.-C. voltage of relatively low amplitude and low source impedance. The zero correction voltage provided by said means is adjustable in amplitude and of selectable opposite phase and is added to the voltage induced in the variable differential transformer secondary. A convenient means is thereby provided for adjusting the calibrated gage meter to a nominal zero reading.

As a further feature of this invention a unique adjustable-gain transistor amplifier is provided to amplify the voltage developed across the differential transformer output winding (combined with the zero-adjustment voltage, if any). Gain of the amplifier, and hence gage range or sensitivity, is changed by simultaneously varying the negative feedback factor $\beta$ (beta) and the open-loop gain $\mu$ (mu) in such a manner as to maintain the product $\mu\beta$ essentially constant. The amplifier is well suited for portable service since it exhibits excellent gain stability and linearity over a wide range of input signal levels and at the same time is economical with respect to battery current drain.

The invention will be further described in connection with the accompanying drawings which show a preferred embodiment thereof.

In the drawings:

FIG. 1 is a view of a gage head in contact with a part to be measured; and

FIG. 2 is a schematic diagram of a gage unit in accordance with the invention.

Referring to FIG. 1, as specifically shown the gage head 10 comprises a housing 11 containing a variable differential transformer having a movable coupling core attached to a plunger rod 12. The plunger rod is movable longitudinally of the housing 11, and a rounded gage tip 13 is attached to the end thereof and is shown in contact with a flat surface of a part 14 to be gaged. Other structures for causing the differential transformer to vary with part size may be employed if desired.

Referring to FIG. 2, the variable differential transformer contained within the gage head of FIG. 1 is shown as comprising a primary coil 20 and a pair of secondary coils 21 and 21' connected in opposition. The movable core 22 is connected to plunger rod 12 of FIG. 1. When the core 22 is in its central or null position, an alternating current in the primary 20 will induce equal voltages in the symmetrically disposed secondary coils 21, 21', and since they are connected in opposition, the resultant output voltage will be a minimum (ideally zero).

When the core 22 is displaced from its central or null position by the surface to be measured, a net A.-C. output signal will be induced in the secondaries the amplitude of which will vary proportionally with displacement from the null position. Since the secondaries 21, 21' are connected in opposition, the phase of the output voltage is opposite on opposite sides of the null position, providing thereby an indication corresponding to direction of displacement. Variable differential transformers are well known in the art and need not be described in further detail.

An oscillator 23 is provided to energize the variable differential transformer substantially sinusoidally. This oscillator includes transistors 24 and 25 with cross-coupling between the opposite collectors and bases, and suitable biasing means. As specifically shown, resistors 26, 27 and 26', 27' are connected as voltage dividers between B— voltage and ground and provide base bias voltages for the transistors. Collector 29 of transistor 24 is coupled to base 32 of transistor 25 by capacitor 28, and in like manner collector 30 of transistor 25 is coupled to base 31 of transistor 24 by capacitor 28'. This cross-coupling provides regenerative feedback to sustain oscillations. Emitters 33 and 34 of the transistors are returned to ground through resistors 35 and 35', respectively, which provide negative feedback and help to stabilize the oscillator.

The primary winding 20 of the variable differential transformer is connected between collectors 29 and 30, and is tuned by a shunt capacitor 40. As will be described more fully hereinafter, this tuned circuit is the primary factor in determining the frequency of oscillation.

This oscillator has been found highly satisfactory in practice, being stable in both frequency and amplitude and giving adequate output with low battery consumption.

Primary winding 37 of a detector driving transformer 36 is also connected between the oscillator collectors. Advantageously the impedance of primary 37 is large compared to that of primary 20 of the differential transformer. B— voltage is supplied to the collectors 29, 30 of the transistors via the center-tap 37' of primary 37 from battery 38, the positive terminal of which is grounded.

In series with the battery supply to the center-tap 37' is a variable resistor 39 which is provided for gage calibration purposes. This resistor limits the current in the transistors 24, 25 and causes the oscillator output voltage to vary as an inverse function of the resistance as the control is adjusted.

It will be noted that if the tuned circuit 20, 40 is removed, the oscillator configuration is like a symmetrical astable multivibrator. Such an oscillator gives a generally square-wave output, usually with transient overshoots, and the frequency and amplitude varies with the time constants of the cross-coupling circuits, the B supply voltage, etc. By varying the calibration resistor 39, the frequency can be varied over a wide range. For example, in one embodiment a variation from a few hundred cycles to about ten kilocycles per second was obtained.

In the same embodiment, with the tuned circuit 20, 40 reconnected, stable substantially sinusoidal oscillations were obtained at a frequency of about 25 kc. and the frequency was substantially unaffected when the calibration resistor 39 was varied.

The oscillator frequency may be selected to meet the requirements of the particular application, and the differential transformer primary tuned accordingly. With the tuned circuit removed, the frequency of oscillation as a multivibrator is preferably well below the selected operating frequency.

Potentiometer 41 is provided as a "zero-adjust" control for the gage. Operationally this control may be adjusted to establish an initial zero meter reading to correspond to a desired nominal part size or, in general, to obtain a desired meter reading for a given position of the differential transformer core 22.

As shown in FIG. 2, the potentiometer is connected between the emitters 33 and 34 of the oscillator transistors, and the slider arm is connected through resistor 42 and capacitor 43 to a small coupling or adding resistor 44 which is shown connected between secondary coil 21' and ground. Thus adjustable portions of the A.-C. voltages developed across the emitter resistors 35 and 35' are connected in parallel across resistor 44, and the resultant added as a correction voltage in series with the output voltage developed across the secondary windings of the differential transformer. Advantageously the resistance of potentiometer 41 is considerably higher than that of resistors 35, 35' to avoid undue loading.

Normally, to obtain efficient operation, the oscillator parameters will be selected so that the transistors conduct primarily on alternate half-cycles. Thus, each transistor will contribute a voltage component across resistor 44 resembling that of a half-wave rectifier. The peaks of the combined components from the two transistors will recur at double the frequency of the sinusoidal voltage across the differential transformer primary.

With the slider of potentiometer 41 set at midscale, the peaks of the two components are of equal amplitude and there is substantially no resultant voltage of fundamental frequency across resistor 44. However, when the slider is adjusted to one side of midscale, the peaks of one component will become larger or smaller than those of the other, depending on the direction of adjustment. Thus the resultant voltage across resistor 44 has a fundamental frequency component which is adjustable in amplitude and of opposite phase on opposite sides of the midscale null point.

Filter means is then provided to eliminate harmonics and make effective substantially only the fundamental frequency component of the zero-adjust voltage. Advantageously the secondary 21, 21' of the differential transformer is tuned for this purpose by capacitor 45, so as to resonate at or near the operating frequency. In one particular embodiment, the capacitor 45 was selected to resonate with secondary 21, 21' somewhat below the operating frequency, thereby providing some capacitive reactance for phase shift correction in the signal supplied to the detector.

For proper operation of the zero adjust circuit, it is desirable that the fundamental frequency component of the voltage across resistor 44 be exactly in-phase or out-of-phase with the signal voltage output of the differential transformer, depending on the adjustment of potentiometer 41. The value of capacitor 43 may be selected with respect to the other components to provide any required phase shift.

The output voltage of the differential transformer, with the "zero-adjust" voltage added thereto, is supplied to a high gain transistor amplifier 46. The gain of this amplifier is made selectably adjustable in order to provide a gage range or sensitivity control.

The first two stages of amplifier 46, including transistors 47 and 48, are connected as grounded-emitter amplifiers while the third stage, including transistor 49, is connected as a grounded-collector amplifier. Each stage has individual negative feedback through the resistors connected between respective emitters and ground.

Overall negative feedback is provided from output to input of the amplifier through a switch which changes the amount of feedback and also the open loop gain of the amplifier.

As shown, the output of the amplifier at emitter 50 is fed back through line 51, selectable branches including capacitors 52, 53, and the switch 54A to the emitter 55 of the input stage. Resistors 56 and 57 are in shunt with respective branches, and the junctions between the resistors and capacitors are connected to contacts of switch 54A. Thus switching from contacts 1, 2 to contacts 3, 4 changes the overall feedback depending on the values of resistors 56, 57 and capacitors 52, 53.

It will be noted that resistors 56, 57 are selectively inserted in the emitter circuit of transistor 47 by the switch. Thus the effective gain of this transistor stage is changed through emitter current feedback, thereby changing the open loop gain of the amplifier at the same time the overall negative feedback is changed.

The overall gain of a feedback amplifier may be expressed by the following general equation:

$$\text{Overall gain} = \frac{1}{\beta} \frac{(\mu\beta)}{(1-\mu\beta)}$$

where $\beta$ (beta) is the negative feedback factor and $\mu$ (mu) is the open loop gain of the amplifier.

Generally speaking, it can be said that increasing the resistance value of 56 or 57 will increase the current feedback in transistor 47, reduce the effective gain of that stage, and hence reduce the mu ($\mu$) of the overall amplifier. On the other hand, this same increase in resistance will result in an increase in the $\beta$ factor for the amplifier. Changing the values of capacitors 52, 53 permits changing the $\beta$ factor without markedly changing $\mu$. Thus a considerable range of values for $\mu$ and $\beta$ are possible with proper selection of resistors 56, 57 and capacitors 52, 53.

In accordance with the teachings of this invention, resistors 56, 57 and capacitors 52, 53 are selected so as to maintain the $\mu\beta$ product approximately constant in the two positions of switch 54A, while at the same time changing $\beta$ by the amount required for the desired change in range (say, 10:1). In this manner the gain is changed while preserving stability, since the stability criterion $\mu\beta$ remains approximately constant.

The combined use of emitter current feedback in each transistor along with the overall negative feedback described above affords excellent amplifier gain stability and linearity over the entire operating range.

The output of amplifier 46 is supplied to a detector which converts the A.-C. signal into a correspondingly varying D.-C. signal. Detector 58, as shown in the drawing, includes a pair of circuits each having a pair of substantially unilaterally conductive devices, advantageously crystal diodes, connected in series. One circuit includes diodes 59, 59′ and the other diodes 60, 60′. The two circuits are fed in parallel from oscillator 23 through the secondary 62 of transformer 36, thus providing a reference or switching voltage. Matched resistors 61 are connected in series with the diodes to effect an improved transformer load impedance match and also to minimize differences in the diode forward resistances.

The amplifier signal output is supplied to the detector through capacitor 63, conductor 66 and the center-tap of secondary winding 62. This voltage is added in series to the balanced switching voltage supplied to the detector by the oscillator. The amplitude of the switching voltage preferably is sufficiently high so that diodes 59, 59′ become strongly conducting during one-half of the cycle, and diodes 60, 60′ become strongly conducting during the other half.

Advantageously, the signal voltage is exactly in-phase or out-of-phase with the switching voltage when the differential transformer is outside its null region, and depending on the direction of displacement of core 22. Suitable phase correction may be effected in the amplifier if required. The phase shift previously described in connection with the tuning of the differential transformer secondary by capacitor 45 is for this purpose.

The D.-C. output of the detector is developed between points 67 and 68 which are between the diodes in respective circuits. Point 67 is direct connected to a fixed reference potential, here shown as ground. Capacitor 64 is connected between point 68 and a fixed reference potential, also shown as ground.

In operation, diodes 59, 59′ develop a positive or a negative voltage across capacitor 63 depending upon the magnitude and phase of the A.-C. signal to be measured during the given half-cycle. This voltage is added in series to the signal supplied to the detector by the amplifier during the following half-cycle, and diodes 60, 60′ conducting on the following half-cycle develop a D.-C. voltage across capacitor 64 to ground that varies with the peak-to-peak voltage of the A.-C. signal.

The polarity of the voltage developed across capacitor 64 is either positive or negative depending upon the phase of the voltage developed across the differential transformer secondary combined with the "zero-adjust" voltage. The magnitude of the D.-C. voltage developed by the detector is proportional to the peak-to-peak A.-C. voltage developed across the differential transformer secondary, combined with the "zero-adjust" voltage. In the null region of the differential transformer, where the phase changes, the magnitude of the detector output voltage also varies as a function of the signal voltage phase angle, thereby correcting for non-ideal characteristics of the differential transformer.

The detector described herein is similar to that described in copending application Serial No. 614,931, filed October 9, 1956, by Torn and Philbin, now U.S. Patent 2,932,134, where the performance and advantages are more fully developed. The specific arrangement here shown is an improvement thereover.

Meter 65 is provided to measure the D.-C. output voltage of the detector, and is preferably of the zero-center type. As shown, the meter is connectable between points 67, 68 through switch section 54B. The arm of switch section 54B is ganged with the arms of switch sections 54A and 54C. Position 1 is the "off" position, grounding meter 65 and opening the battery circuit. Positions 2 and 3 are different gage range positions corresponding to the different gains provided by amplifier 46. In position 4 the meter reads the battery voltage, as a convenient means for checking the battery condition.

Meter 65 is advantageously calibrated in decimal parts of an inch and two scales, or one scale with a multiplying factor, employed for the two sensitivity ranges. In initial operation, calibration resistor 39 may be adjusted until the meter scale readings correspond accurately with displacement of the core 22 of the differential transformer. This adjustment can conveniently be effected by placing the gage head on a suitable part as indicated in FIG. 1. A stand can be employed to hold the gage head in position and the head adjusted until the meter 65 reads on scale. Then, a shim of known thickness may be inserted between the probe tip 13 and part 14 and the change in meter reading noted. Resistor 39 is then adjusted until the change in the meter reading corresponds accurately with the known shim dimension. With suitable design of the amplifier and a satisfactorily linear differential transformer, linear operation of the meter over both ranges may be obtained. This linearity may be checked by employing shims of different thickness.

The meter may be used for many different purposes in practice. As an example, it may be used to determine departures from desired nominal part size. For such purposes the gage head 10 may be supported in a suitable stand, caliper, etc. and a master part placed in position for measurement. Mechanical adjustments may be employed to displace the gage head until meter 65 reads on scale, and preferably near zero. Potentiometer 41 may then be adjusted until the meter reads exactly zero. For greatest accuracy, this operation is performed with the meter in its most sensitive range. Thereafter, the meter will read departures of different parts from nominal size.

If a master part is not available for zero adjustment, a part of known size may be employed and the potentiometer 41 adjusted until the meter reads the difference between the known part size and the desired nominal size. Thereafter meter readings will correspond to departures of parts from the desired nominal size.

The invention has been described in connection with a specific embodiment thereof. While specific detailed circuits have been shown for completeness of disclosure, it will be understood that many modifications may be made therein within the spirit and scope of the invention. Also, while PNP transistors are used in the circuits as shown, equivalent NPN types can be employed if desired. Although a zero-center meter has been shown as an indicator device, the detector output voltage may be used to control relay circuits, recording instruments and other well-known indicating devices. If desired, one or more features of the invention may be employed while omitting others.

We claim:

1. Gaging apparatus which comprises a gage head containing a variable differential transformer having primary and secondary windings and movable means for varying the coupling therebetween in accordance with a part being gaged, said differential transformer upon energization yielding an A.-C. output signal varying in amplitude with departure from the null position of said movable means, a pair of transistors each having a base, an emitter and a collector, the primary of said differential transformer being connected between the collectors of said transistors, a power source connected to supply operating voltage between emitters and collectors of respective transistors, a pair of impedances connected between respective emitters and one terminal of said power source, means for biasing the bases of said transistors, cross-coupling circuits connected between the collectors and opposite bases of said transistors respectively, means for tuning the primary of said differential transformer to produce oscillations at a desired oscillation frequency, said tuned primary being the primary frequency-determining circuit for said oscillations, an amplifier for amplifying the output signal of said differential transformer, a detector supplied with the output signal from said amplifier and adapted to yield a correspondingly varying D.-C. output signal, and indicating means connected to the output of said detector.

2. Gaging apparatus which comprises a gage head containing a variable differential transformer having primary and secondary windings and movable means for varying the coupling therebetween in accordance with a part being gaged, said differential transformer upon energization yielding an A.-C. output signal varying in amplitude with departure from the null position of said movable means, a pair of transistors each having a base, an emitter and a collector, the primary of said differential transformer being connected between the collectors of said transistors, a power source connected to supply operating voltage between emitters and collectors of respective transistors, a pair of resistances connected between respective emitters and one terminal of said power source, means for biasing the bases of said transistors, cross-coupling capacitors connected between the collectors and opposite bases of said transistors respectively, capacitive means for tuning the primary of said differential transformer to produce substantially sinusoidal oscillations at a desired oscillation frequency, said tuned primary being the primary frequency-determining circuit for said oscillations, an amplifier for amplifying the output signal of said differential transformer, a detector supplied with the output signal from said amplifier and adapted to yield a correspondingly varying D.-C. output signal, and indicating means connected to the output of said detector.

3. Gaging apparatus which comprises a gage head containing a variable differential transformer having primary and secondary windings and movable means for varying the coupling therebetween in accordance with a part being gaged, said differential transformer upon energization yielding an A.-C. output signal varying in amplitude with departure from the null position of said movable means, a pair of transistors each having a base, an emitter and a collector, the primary of said differential transformer being connected between the collectors of said transistors, a power source connected to supply operating voltage between emitters and collectors of respective transistors, a pair of similar resistances connected between respective emitters and one terminal of said power source, biasing means including a pair of similar resistance voltage divider circuits connected across said power source with similar intermediate points thereof connected to respective bases of said transistors, cross-coupling capacitors connected between the collectors and opposite bases of said transistors respectively, capacitive means for tuning the primary of said differential transformer to produce substantially sinusoidal oscillations at a desired oscillation frequency, said tuned primary being the primary frequency-determining circuit for said oscillations, an amplifier for amplifying the output signal of said differential transformer, a detector supplied with the output signal from said amplifier and adapted to yield a correspondingly varying D.-C. output signal, and indicating means connected to the output of said detector.

4. Gaging apparatus which comprises a gage head containing a variable differential transformer having primary and secondary windings and movable means for varying the coupling therebetween in accordance with a part being gaged, said differential transformer upon energization yielding an A.-C. output signal varying in amplitude with departure from the null position of said movable means, a pair of transistors each having a base, an emitter and a collector, the primary of said differential transformer being connected between the collectors of said transistors, a power source connected to supply operating voltage between emitters and collectors of respective transistors, a pair of impedances connected between respective emitters and one terminal of said power source, means for biasing the bases of said transistors, cross-coupling circuits connected between the collectors and opposite bases of said transistors respectively, means for tuning the primary of said differential transformer to produce oscillations at a desired oscillation frequency, said tuned primary being the primary frequency-determining circuit for said oscillations, a variable resistance connected in series with said power source and the collectors of said transistors for altering the amplitude of said oscillations, an amplifier for amplifying the output signal of said differential transformer, a detector supplied with the output signal from said amplifier and adapted to yield a correspondingly varying D.-C. output signal, and indicating means connected to the output of said detector.

5. Gaging apparatus which comprises a gage head containing a variable differential transformer having primary and secondary windings and movable means for varying the coupling therebetween in accordance with a part being gaged, said differential transformer upon energization yielding an A.-C. output signal varying in amplitude with departure from the null position of said movable means, a pair of transistors each having a base, an emitter and a collector, the primary of said differential transformer being connected between the collectors of said transistors, a power source connected to supply operating voltage between emitters and collectors of respective transistors, a pair of resistances connected between respective emitters and one terminal of said power source, means for biasing the bases of said transistors, cross-coupling capacitors connected between the collectors and opposite bases of said transistors respectively, capacitive means for tuning the primary of said differential transformer to produce substantially sinusoidal oscillations at a desired oscillation frequency, said tuned primary being the primary frequency-determining circuit for said oscillations, a variable resistance connected in series with said power source and the collectors of said transistors for altering the amplitude of said oscillations, an amplifier for amplifying the output signal of said differential transformer, a detector supplied with the output signal from said amplifier and adapted to yield a correspondingly varying D.-C. output signal, and indicating means connected to the output of said detector.

6. Gaging apparatus which comprises a variable differential transformer having primary and secondary windings and movable means for varying the coupling therebetween in accordance with a part being gaged, said differential transformer upon energization yielding an A.-C. output signal varying in amplitude with departure from the null position of said movable means, a pair of transistors each having a base, an emitter and a collector, the primary of said differential transformer being connected between the collectors of said transistors, a power source connected to supply operating voltage between emitters and collectors of respective transistors, a pair of impedances connected between respective emitters and one terminal of said power source, means for biasing the bases of said transistors, cross-coupling circuits connected between the collectors and opposite bases of said transistors respectively, means for tuning the primary of said differential transformer to produce oscillations at a desired oscillation frequency, a potentiometer connected between the emitters of said transistors for obtaining an A.-C. correctional signal of adjustable amplitude, circuit means for combining said correction signal with the output signal of said differential transformer, an amplifier for amplifying said combined signals, a detector supplied with the output signal from said amplifier and adapted to yield a correspondingly varying D.-C. output signal, and indicating means connected to the output of said detector.

7. Gaging apparatus which comprises a variable differential transformer having primary and secondary windings and movable means for varying the coupling therebetween in accordance with a part being gaged, said differential transformer upon energization yielding an A.-C. output signal varying in amplitude with departure from the null position of said movable means and of opposite phase on opposite sides of said null, a pair of transistors each having a base, an emitter and a collector, the primary of said differential transformer being connected between the collectors of said transistors, a power source connected to supply operating voltage between emitters and collectors of respective transistors, a pair of resistances connected between respective emitters and one terminal of said power source, means for biasing the bases of said transistors, cross-coupling capacitors connected between the collectors and opposite bases of said transistors respectively, capacitive means for tuning the primary of said differential transformer to produce substantially sinusoidal oscillations at a desired oscillation frequency, a potentiometer connected between the emitters of said transistors for obtaining an A.-C. correction signal of adjustable amplitude and selectable opposite phase, circuit means for adding said correction signal to the output signal of the secondary of said differential transformer, means for tuning said secondary to resonate at a frequency near said oscillation frequency to thereby reject harmonics of said frequency in said correction signal, an amplifier for amplifying said combined signals, a detector supplied with the output signal from said amplifier and adapted to yield a correspondingly varying D.-C. output signal, and indicating means connected to the output of said detector.

8. Gaging apparatus which comprises a variable differential transformer having primary and secondary windings and movable means for varying the coupling therebetween in accordance with a part being gaged, said differential transformer upon energization yielding an A.-C. output signal varying in amplitude with departure from the null position of said movable means and of opposite phase on opposite sides of said null, a pair of transistors each having a base, an emitter and a collector, the primary of said differential transformer being connected between the collectors of said transistors, a power source connected to supply operating voltage between emitters and collectors of respective transistors, a pair of resistances connected between respective emitters and one terminal of said power source, means for biasing the bases of said transistors, cross-coupling capacitors connected between the collectors and opposite bases of said transistors respectively, capacitive means for tuning the primary of said differential transformer to produce substantially sinusoidal oscillations at a desired oscillation frequency, said tuned primary being the primary frequency-determining circuit for said oscillations, a variable resistance connected in series with said power source and the collectors of said transistors for altering the amplitude of said oscillations, a potentiometer connected between the emitters of said transistors for obtaining an A.-C. correction signal of adjustable amplitude and selectable opposite phase, circuit means for adding said correction signal to the output signal of the secondary of said differential transformer, means for tuning said secondary to resonate at a frequency near said oscillation frequency to thereby reject harmonics of said frequency in said correction signal, an amplifier for amplifying said combined signals, a detector supplied with the output signal from said amplifier and adapted to yield a correspondingly varying D.-C. output signal, and indicating means connected to the output of said detector.

9. Gaging apparatus which comprises a variable differential transformer having primary and secondary windings and movable means for varying the coupling therebetween in accordance with a part being gaged, means for energizing the primary of said differential transformer to yield an A.-C. output signal varying in amplitude with departure from the null position of said movable means, and amplifier for amplifying said output signal having a plurality of transistor stages connected in cascade, a negative feedback circuit connected from the output of one of said stages to the emitter of a preceding stage through a multiple position range switch, said feedback circuit including a plurality of resistances in shunt thereto, said switch being connected between said emitter and said resistances to selectively insert the resistances in the emitter circuit of said preceding stage to change the effective gain thereof and simultaneously change the feedback through said feedback circuit, said feedback circuit including said resistances being predetermined to maintain the product of the open loop gain and the feedback factor substantially constant in different positions of said switch while changing the feedback factor to alter the overall amplifier gain, a detector supplied with the output signal from said amplifier and adapted to yield a correspondingly varying D.-C. output signal, and indicating means connected to the output of said detector.

10. Gaging apparatus which comprises a variable differential transformer having primary and secondary windings and movable means for varying the coupling therebetween in accordance with a part being gaged, means for energizing the primary of said differential transformer to yield an A.-C. output signal varying in amplitude with departure from the null position of said movable means, an amplifier for amplifying said output signal having a plurality of transistor stages connected in cascade, a negative feedback circuit connected from the output of one of said stages to the emitter of a preceding stage through a multiple-position range switch, said feedback circuit including a plurality of branches each having a series capacitor and a shunt resistance with the junction therebetween connected to a respective position of said switch, the arm of said switch being connected to the emitter of said preceding stage whereby switching simultaneously changes the amount of feedback through said circuit and selectively inserts said resistances in the emitter circuit of said preceding stage to change the effective gain of said stage, said series capacitors and shunt resistances being predetermined to maintain the product of the open loop gain and the feedback factor substantially constant in different positions of said switch while changing the feedback factor to alter the overall amplifier gain, a detector supplied with the output signal from said amplifier and adapted to yield a correspondingly varying D.-C. output signal, and indicating means connected to the output of said detector.

11. Gaging apparatus which comprises a variable differential transformer having primary and secondary windings and movable means for varying the coupling therebetween in accordance with a part being gaged, transistor oscillator means for energizing the primary of said differential transformer to yield an A.-C. output signal varying in amplitude with departure from the null position of said movable means, a control circuit supplied by said oscillator and adjustable to obtain an A.-C. correction signal of adjustable amplitude, circuit means for combining said correction and output signals, an amplifier for amplifying said combined signals including a plurality of transistor stages connected in cascade, a negative feedback circuit connected from the output of said amplifier to the emitter of the input stage thereof through a multiple-position range switch, said feedback circuit including a plurality of branches each having a series capacitor and a shunt resistance with the junction therebetween connected to a respective position of said switch, the arm of said switch being connected to the emitter of said input stage whereby switching simultaneously changes the amount of feedback through said circuit and selectively inserts said resistances in the emitter circuit of said input stage to change the effective gain of said stage, said series capacitors and shunt resistances being predetermined to maintain the product of the open loop gain and the feedback factor substantially constant in different positions of said switch while changing the feedback factor to alter the overall amplifier gain, a detector supplied with the output signal from said amplifier and adapted to yield a correspondingly varying D.-C. output signal, and indicating means connected to the output of said detector.

12. Gaging apparatus which comprises a variable differential transformer having primary and secondary windings and movable means for varying the coupling therebetween in accordance with a part being gaged, said differential transformer upon energization yielding an A.-C. output signal varying in amplitude with departure from the null position of said movable means, a pair of transistors each having a base, an emitter and a collector, the primary of said differential transformer being connected between the collectors of said transistors, a power source connected to supply operating voltage between emitters and colectors of respective transistors, a pair of resistances connected between respective emitters and one terminal of said power source, means for biasing the bases of said transistors, cross-coupling capacitors connected between the collectors and opposite bases of said transistors respectively, capacitive means for tuning the primary of said differential transformer to produce substantially sinusoidal oscillations at a desired oscillation frequency, said tuned primary being the primary frequency-determining circuit for said oscillations, a variable resistance connected in series with said power source and the collectors of said transistors for altering the amplitude of said oscillations, a potentiometer connected between the emitters of said transistors for obtaining an A.-C. correction signal of adjustable amplitude, circuit means for adding said correction signal to the output signal of the secondary of said differential transformer, means for tuning said secondary to resonate at a frequency near said oscillation frequency to thereby reject harmonics of said frequency in said correction signal, an amplifier for amplifying said combined signals including a plurality of transistor stages connected in cascade, a negative feedback circuit connected from the output of said amplifier to the emitter of the input stage thereof through a multiple-position range switch, said feedback circuit including a plurality of branches each having a series capacitor and a shunt resistance with the junction therebetween connected to a respective position of said switch, the arm of said switch being connected to the emitter of said input stage whereby switching simultaneously changes the amount of feedback through said circuit and selectively inserts said resistances in the emitter circuit of said input stage to change the effective gain of said stage, said series capacitors and shunt resistances being predetermined to maintain the product of the open loop gain and the feedback factor substantially constant in different positions of said switch while changing the feedback factor to alter the overall amplifier gain, a detector supplied with the output signal from said amplifier and adapted to yield a correspondingly varying D.-C. output signal, and indicating means connected to the output of said detector.

13. Gaging apparatus which comprises a variable differential transformer having primary and secondary windings and movable means for varying the coupling therebetween in accordance with a part being gaged, transistor oscillator means for energizing the primary of said differential transformer to yield an A.-C. output signal varying in amplitude with departures from the null position of said movable means, a transistor amplifier for amplifying said output signal, a detector including a pair of circuits each having a pair of substantially unilaterally conductive devices connected in series, center-tapped means for energizing said circuits in parallel from said oscillator means, said unilaterally conductive devices being poled to pass current in alternate circuits during alternate half-cycles of the oscillations supplied thereto, a capacitor connected to the center tap of said energizing means, means for supplying the output of said amplifier through said capacitor to said center tap, indicating means connected between points of said circuits which are between the unilaterally conductive devices in respective circuits, a direct connection from one of said points to a fixed reference potential and a capacitor connected from the other of said points to a fixed reference potential.

14. Gaging apparatus which comprises a variable differential transformer having primary and secondary windings and movable means for varying the coupling therebetween in accordance with a part being gaged, said differential transformer upon energization yielding an A.-C. output signal varying in amplitude with departure from the null position of said movable means, a pair of transistors each having a base, an emitter and a collector, the primary of said differential transformer being connected between the collectors of said transistors, a power supply source, a pair of resistances connected between respective emitters and one terminal of said power source, means for biasing the bases of said transistors, cross-coupling capacitors connected between the collectors and opposite bases of said transistors respectively, capacitive means for tuning the primary of said differential transformer to produce substantially sinusoidal oscillations at a desired oscillation frequency, a transformer having a center-tapped primary and a center-tapped secondary, said primary being D.-C. connected between the collectors of said transistors, a variable resistance connected between the other terminal of said power source and the center tap of said primary for adjustably energizing said collectors and thereby altering the amplitude of said oscillations, a transistor amplifier for amplifying the output signal of said differential transformer, a detector including a pair of circuits each having a pair of diodes connected in series, connections from said transformer secondary to energize said pair of circuits in parallel, said diodes being poled to pass current in alternate circuits during alternate half-cycles of the oscillation frequency, a capacitor coupling the output of said amplifier to the center tap of said transformer secondary, indicating means connected between points of said circuits which are between the diodes in respective circuits, a direct connection from one of said points to a fixed reference potential and a capacitor connected from the other of said points to said fixed reference potential.

15. Gaging apparatus which comprises a variable differential transformer having primary and secondary windings and movable means for varying the coupling therebetween in accordance with a part being gaged, said differential transformer upon energization yielding an A.-C. output signal varying in amplitude with departure from the null position of said movable means and of opposite phase on opposite sides of the null, a pair of transistors each having a base, an emitter and a collector, the primary of said differential transformer being connected between the collectors of said transistors, a power source, a pair of resistances connected between respective emitters and one terminal of said power source, means for biasing the bases of said transistors, cross-coupling capacitors connected between the collectors and opposite bases of said transistors respectively, capacitive means for tuning the primary of said differential transformer to produce substantially sinusoidal oscillations at a desired oscillation frequency, a transformer having a center-tapped primary and a center-tapped secondary, said primary being D.-C. connected between the collectors of said transistors, a variable resistance connected between the other terminal of said power source and the center tap of said primary for adjustably energizing said collectors and thereby altering the amplitude of said oscillations, a potentiometer connected between the emitters of said transistors for obtaining an A.-C. correction signal of adjustable amplitude, circuit means for adding said correction signal to the output signal of the secondary of said differential transformer, means for tuning said secondary to resonate at a frequency near said oscillation frequency to thereby reject harmonics of said frequency in said correction signal, an amplifier for amplifying said combined signals including a plurality of transistor stages connected in cascade, a negative feedback circuit connected from the output of said amplifier to the emitter of the input stage thereof through a multiple-position range switch, said feedback circuit including a plurality of branches each having a series capacitor and a shunt resistance with the junction therebetween connected to a respective position of said switch, the arm of said switch being connected to the emitter of said input stage whereby switching simultaneously changes the amount of feedback through said circuit and selectively inserts said resistances in the emitter circuit of said input stage to change the effective gain of said stage, said series capacitors and shunt resistances being predetermined to maintain the product of the open loop gain and the feedback factor substantially constant in different positions of said switch while changing the feedback factor to alter the overall amplifier gain, a detector including a pair of circuits each having a pair of diodes connected in series, connections from said transformer secondary to energize said pair of circuits in parallel, said diodes being poled to pass current in alternate circuits during alternate half-cycles of the oscillation frequency, a capacitor coupling the output of said amplifier to the center tap of said transformer secondary, indicating means connected between points of said circuits which are between the diodes in respective circuits, a direct connection from one of said points to a fixed reference potential and a capacitor connected from the other of said points to said fixed reference potential.

16. Gaging apparatus which comprises a variable differential transformer having primary and secondary windings and movable means for varying the coupling therebetween in accordance with a part being gaged, means for A.-C. energizing the primary of said differential transformer to yield an A.-C. output signal from the secondary thereof varying in amplitude with departures from the null position of said movable means, a detector including a pair of circuits each having a pair of substantially unilaterally conductive devices connected in series, center-tapped means for energizing said circuits in parallel from said A.-C. energizing means, said unilaterally conductive devices being poled to pass current in alternate circuits during alternate half-cycles of the oscillations supplied thereto, a capacitor connected to the center tap of said energizing means, means for supplying the output of said differential transformer through said capacitor to said center tap, indicating means connected between points of said circuits which are between the unilaterally conductive devices in respective circuits, a direct connection from one of said points to a fixed reference potential and a capacitor connected from the other of said points to a fixed reference potential.

17. Gaging apparatus which comprises a variable differential transformer having primary and secondary windings and movable means for varying the coupling therebetween in accordance with a part being gaged, an oscillator for energizing the primary of said differential transformer to yield an A.-C. output signal from the secondary thereof varying in amplitude with departures from the null position of said movable means and of opposite phase on opposite sides of the null, an amplifier for amplifying the output of said differential transformer, a detector including a pair of circuits each having a pair of diodes connected in series, a center-tapped transformer for energizing said circuits in parallel from said oscillator means, said diodes being poled to pass current in alternate circuits during alternate half-cycles of the oscillations supplied thereto, a capacitor coupling the output of said amplifier to the center tap of said transformer, indicating means connected between points of said circuits which are between the diodes in respective circuits, a direct connection from one of said points to a fixed reference potential and a capacitor connected from the other of said points to said fixed reference potential.

References Cited in the file of this patent
UNITED STATES PATENTS

| | | |
|---|---|---|
| 2,297,926 | Usselman | Oct. 6, 1942 |
| 2,437,639 | Floyd | Mar. 9, 1948 |
| 2,445,880 | Hathaway | July 27, 1948 |
| 2,508,370 | Bozoian | May 23, 1950 |
| 2,534,323 | Thomson | Dec. 19, 1950 |
| 2,759,104 | Skellett | Aug. 14, 1956 |
| 2,823,269 | Van Abbe | Feb. 11, 1958 |
| 2,827,787 | Kroeger | Mar. 25, 1958 |
| 2,835,749 | McCormack | May 20, 1958 |
| 2,885,660 | Hecox | May 5, 1959 |
| 2,916,565 | Ensink | Dec. 8, 1959 |
| 2,934,750 | Schaefer | Apr. 26, 1960 |

OTHER REFERENCES

Shafer: "Phase-Selective Detectors," Electronics Buyers' Guide, June 1954, Mid-Month, pages 4-16—R-19.